W. BEAVER.
PLOW.
APPLICATION FILED JULY 22, 1918.
1,360,491.
Patented Nov. 30, 1920.
2 SHEETS—SHEET 2.
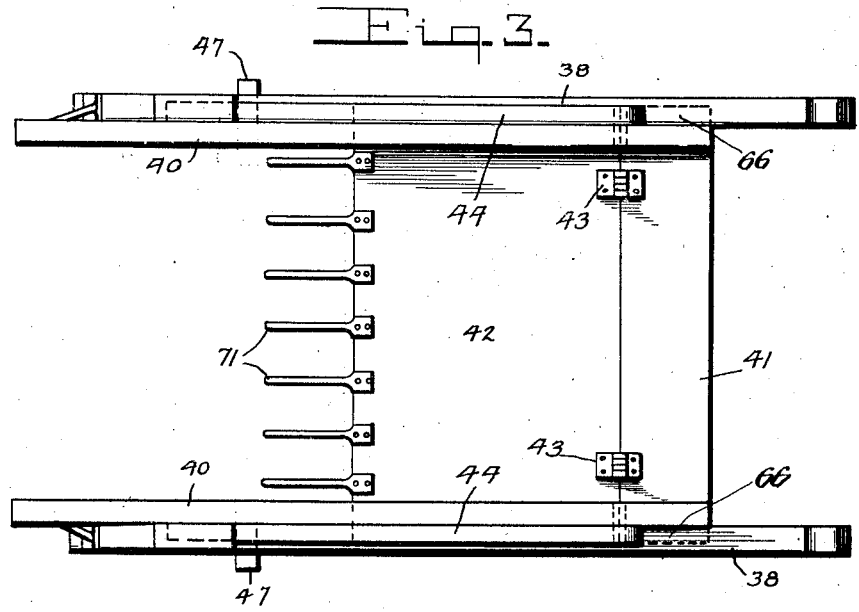
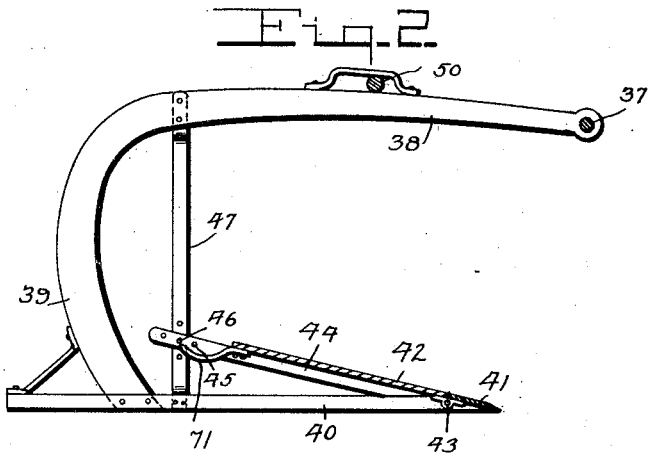
Witness
R. N. Jones
J. O. Parker
Inventor
W. Beaver
By Chandler Chandler
Attorney

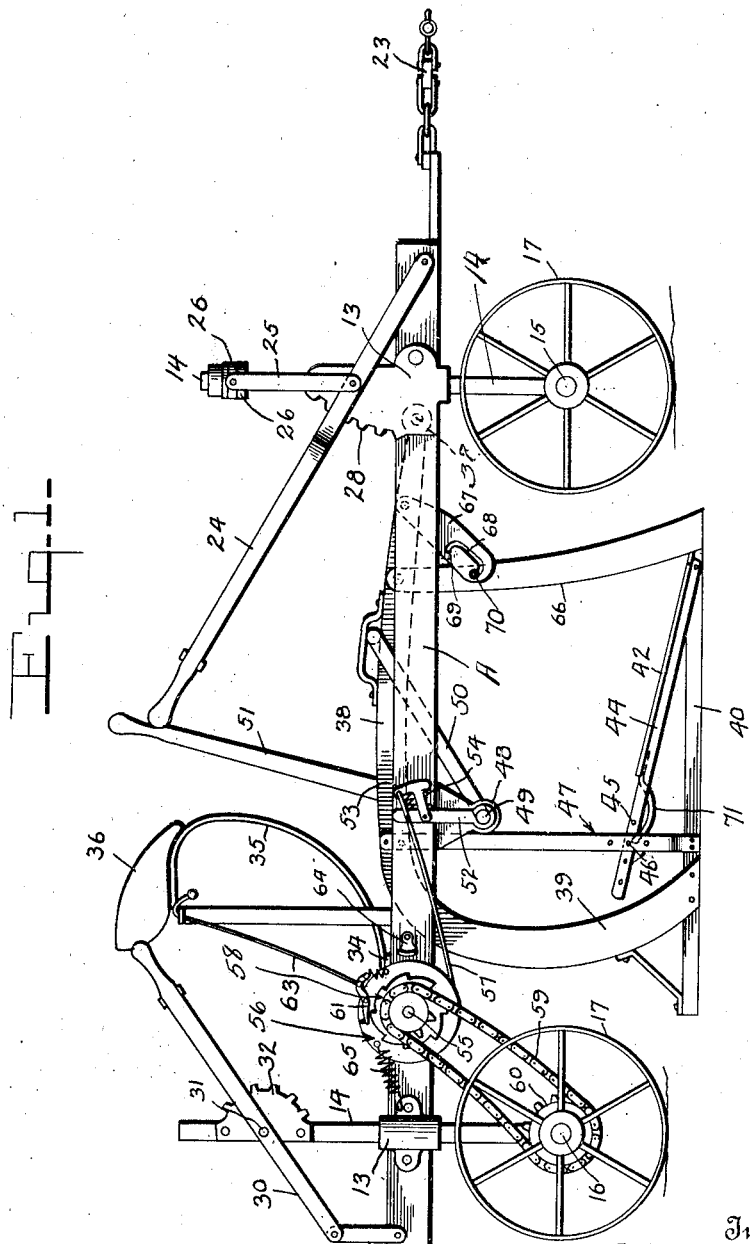

UNITED STATES PATENT OFFICE.

WILLIE BEAVER, OF ROLETTE, NORTH DAKOTA.

PLOW.

1,360,491. Specification of Letters Patent. Patented Nov. 30, 1920.

Application filed July 22, 1918. Serial No. 246,049.

*To all whom it may concern:*

Be it known that I, WILLIE BEAVER, a citizen of the United States, residing at Rolette, in the county of Rolette, State of North Dakota, have invented certain new and useful Improvements in Plows; and I do hereby declare the following to be a full, clear, and exact description of the invention, such as will enable others skilled in the art to which it appertains to make and use the same.

The invention relates to a plow and more particularly to the class of wheeled plows.

The primary object of the invention is the provision of a plow of this character wherein the mold board can be readily adjusted to assume varying angles to the line of draft and both the share and said mold board can be raised and lowered relative to the ground so as to increase or decrease the depth of cutting action of the share, and at the same time enabling the soil instead of being turned over in the usual manner to slide over the mold board for the loosening of the soil and the falling of the same behind the mold board, thus leaving the stubble and other matter on top.

Another object of the invention is the provision of a plow of this character wherein the construction thereof is novel in form so as to enable the proper adjustment and the soil will be loosened for the proper working thereof and the breaking up of the same, the plow being also useful in loosening the dirt in a road bed for the leveling thereof by a grader.

A further object of the invention is the provision of a plow wherein knives are arranged in opposite sides of the share and mold boards so as to cut the furrow in the formation thereof, the knives being readily adjustable and automatically raised with the share and mold board to clear the ground, and also to regulate the depth of cutting action of said plow.

A still further object of the invention is the provision of a plow of this character wherein the construction thereof is generally improved in various particulars, to the end that efficiency in operation may be promoted as well as simplicity in construction and convenience of adjustment and control.

The invention will be particularly explained in the specific description following.

Reference is to be had to the accompanying drawings forming a part of this specification, in which similar characters of reference indicate corresponding parts in all views.

In the accompanying drawing:—

Figure 1 is a side elevation of a plow constructed in accordance with the invention;

Fig. 2 is a fragmentary longitudinal sectional view;

Fig. 3 is a bottom plan view showing in detail the connection of the mold board with the plow share.

In constructing a practical embodiment of the invention in accordance with the illustrated example, a frame A is provided preferably of rectangular shape and comprises spaced parallel side bars and front and rear cross end bars. Mounted on the side bars near the front and rear ends of the frame A are vertical guide castings 13 in which are slidably fitted the stems 14 of front and rear axles 15 and 16 respectively on which are journaled the ground wheels 17 of any approved type.

Hitched to the front end of the frame A is a suitable doubletree 23 for the attachment of draft animals in the usual well known manner.

Swingingly connected to the frame A at opposite sides thereof are forwardly inclined hand levers 24 to which are pivoted links 25, the same being also pivoted to collars 26 swiveled on the stems 14 of the front axles 15 and each of these levers carries a hand release latch adapted for engagement with a toothed segment 28 formed on each front guide casting 13 so that in this manner the lever 24 can be locked in adjusted position. On the raising and lowering of the lever 24 the frame can be lowered and raised at its front end as will be clearly apparent. Connected to the rear end of the frame A at each side thereof is a link 29 to which is pivoted a hand lever 30 the same being also pivoted at 31 to a toothed segment 32 fixed to each of the stems 14 of the rear axles 16 and this lever 30 carries a latch for engagement with the toothed segment 32 so that the lever 30 can be locked in adjusted position and on operating these levers 30 the rear end of the frame A can be raised and lowered as will be obvious.

Near the rear end of the frame A is a cross bar 34 to which is connected the seat standard or post 35 carrying a seat 36 of the usual construction.

Journaled transversely in the frame A near the forward end thereof is a shaft 37 to which is pivoted the front end of a duplex plow beam 38 having the rearwardly and downwardly extending forwardly inclined standard 39 to which are fixed the frogs 40 supporting a plow share 41 which is in the form of a straight angularly disposed blade arranged transversely below the frame A and swingingly connected to this share at its rear edge is a plate-like mold board 42 which is connected to said share through the medium of hinges 43 arranged on the bottom faces of the mold board and share, the mold board being fitted with side arms 44 having a series of holes 45 for adjustably receiving a retaining pin 46 which is also adjustably engaged in vertical braces 47 fixed to the frogs 40 and the plow beam 38 so that in this manner the mold board 42 can be manually angularly adjusted relative to the plow share.

Formed on and depending from the side beams of the frame A intermediately thereof are hangers 48 in which are journaled the trunnion ends 49 of a raising and lowering bail or yoke 50 which straddles the plow beam 38 and is suitably connected therewith so that on the rocking of the bail or yoke the beam 38 will be raised and lowered thereby. Connected to one of the trunnions 49 at one side of the frame is a hand lever 51 so that the bail or yoke can be manually raised or lowered while connected to the other trunnion at the opposite side of the frame A is a lever 52 to which is pivoted a spring held catch 53 normally engaging a keeper 54 on the side beam of the frame and this catch locks the lever 52 against movement and the bail or yoke 50 in lowered position.

Mounted in suitable bearings in the frame A is a transverse shaft 55 carrying a pulley 56 which has fixed thereto one end of a cable 57 adapted to be wound on and unwound from said pulley, the cable being connected to the catch 53 for automatically releasing the same and moving the lever 52 on the winding of the cable upon the pulley 56 to raise the bail or yoke 50. The pulley 56 is loose upon the shaft 55 and at one side thereof is a ratchet wheel which is formed with a sprocket gear 58 having trained thereover an endless and rather loose sprocket chain 59 the same being also trained over a sprocket wheel 60 fixed to one of the rear wheels 17 so that motion from the latter will be imparted to the ratchet wheel for a purpose presently described. Slack in this sprocket chain may be taken up by a proper belt tightener operatively disposed with respect thereto.

Eccentrically pivoted to the pulley wheel 56 is a ratchet dog 61 for engagement with the ratchet wheel and this dog is acted upon through the medium of a spring to normally hold the same out of engagement with the ratchet wheel, while connected with the dog is a pull cable 63 extended within reach of the operator when occupying the seat 36 so that on manually pulling upon the cable 63 the dog 61 can be thrown into engagement with the ratchet wheel thereby locking the pulley therewith so that the pulley will rotate with the ratchet wheel for the automatic raising of the plow beam 38. Mounted on the frame A in the path of the dog 61 is a trip cam 64 which automatically releases the dog from the ratchet wheel on the turning of the pulley a predetermined distance for the automatic lowering of the plow beam as will be apparent.

Connected to the pulley 56 is a coiled tension spring 65 which is also connected to the rear guide casting 13 and this spring is active upon the pulley when the dog 61 is released from the ratchet wheel to reset the pulley in the automatic lowering of the plow beam as will be obvious.

Pivoted to the plow beam 38 at opposite sides of the share 41 are vertically swinging knives 66 which serve to cut the sides of the furrow on the advancement of the plow. Pivoted forwardly of the knives on the frame are adjustable braces 67 having slots 68 with offset terminals 69 and in the slot 68 engages a pin 70 which is adapted to engage in either terminal 69 for holding the knife 66 in adjusted position.

Formed on and extending rearwardly from the rear edge of the mold board 42 are spaced tines 71 which serve to break the loosened soil when riding over the mold board and dropping therefrom rearwardly of the same in the advancement of the plow.

It will be clearly apparent in the operation of the machine that the plow beam 38 can be either manually or automatically raised and lowered and also that the mold board 42 can be angularly adjusted by the operator to vary the lifting of the soil when cut by the share 41 and on the advancement of the machine the soil will be cut by said share and will move rearwardly over the mold board and subsequently drop behind the same, thereby loosening the soil and the stubble brought to the top and deposited thereon, the hard soil being broken up when it is dropped from the mold board behind the same and the knives 66 will cut the sides of the furrow on the advancement of the machine.

The depth of the cutting action of the share 41 can be regulated by raising and lowering the frame A in a manner as hereinbefore set forth.

From the foregoing it is thought that the construction and the manner of operation of the plow will be clearly understood, and therefore a more extended explanation has been omitted.

What is claimed is:—

1. In a plow, a wheeled frame, a plow beam and standard supported thereby, a frog carried by the standard, and a brace rising from the frog and having a series of holes; combined with a share, a moldboard hinged thereto, a side arm attached to the moldboard and extending rearward across said brace and pierced with a series of holes, and an adjusting element adapted for engagement with selected holes in both series.

2. In a plow, a wheeled frame, duplex plow beams and standards carried thereby, frogs extending forwardly from said standards, and a share carried by the frogs; combined with a moldboard hinged to the share and extending rearwardly therefrom and having tines across its rear end, a brace rising from each frog at a point laterally disposed beyond said tines, and means for adjustably supporting the moldboard from the brace whereby the inclination of the moldboard may be varied.

3. In a plow, a wheeled frame, means for raising and lowering said frame, a plow beam supported by the frame, a plow share carried by the beam, a forwardly inclined mold board extending rearwardly from the share, means for vertically adjusting the mold board to vary the inclination thereof, and tines extending rearwardly from said mold board.

4. In a plow, a wheeled frame, a plow beam and standard supported thereby, a frog and plow share carried by the standard, a mold board hinged to and extending rearwardly from the share, a brace rod rising from the frog to the beam, and means for attaching the rear end of the mold board to the brace at various heights, for the purpose set forth.

5. In a plow, a wheeled frame, duplex plow beams and standards supported thereby, frogs carried by the standards, and a share carried by the frogs; combined with a moldboard hinged to and extending rearwardly from the share, braces rising from the frogs to the beams, and means for attaching the rear end of the moldboard to and between the braces at various heights, for the purpose set forth.

6. In a plow, a wheeled frame, means for raising and lowering said frame, a plow beam pivoted to the frame, a plow share carried by the beam, a forwardly inclined moldboard extending rearwardly from the share, means for vertically adjusting the rear edge of the moldboard to vary its inclination, and means for adjusting the beam on its pivot to set the share and moldboard at the desired height.

In testimony whereof, I affix my signature, in the presence of two witnesses.

WILLIE BEAVER.

Witnesses:
D. L. QUINELAN,
ADOLPH STENSETH.